3,087,857
TREATMENT OF MOUTHS OF ANIMALS

William D. Davis, Redwood City, and Albert J. Miller, Jr., San Jose, Calif.; said Davis assignor, by mesne assignments, to Amserv, Inc., Burlingame, Calif., a corporation of California
No Drawing. Filed May 27, 1960, Ser. No. 32,075
4 Claims. (Cl. 167—53.2)

This invention relates to the treatment of mouths of animals and to a product useful in such treatment. Various domestic animals, and particularly dogs, have objectionable odors emanating from the mouth which detract from the enjoyment of the owner in the companionship of the animal. The present invention relates to the reduction or eradication of such odors.

In essence, the invention relates to spraying the mouth, and particularly the portion around the teeth, with a product hereinafter described either in powder or in liquid form. For such purpose the use of a plastic squeeze bottle having a spout of about two inches in length is found desirable. The lips of the animal are folded back by the user and the squeeze bottle employed to spray the product around the teeth. Normal salivation of the animal causes the product to effervesce so as to reach all parts of the outer mouth of the animal, destroying odor creating bacteria and cleansing the mouth by an abrasive action to loosen food particles and other foreign substances. If even a considerable quantity of the material is swallowed no harmful effect results. As a matter of fact, the product has certain beneficial effects for mild digestive and respiratory disturbances of the animal so that swallowing reasonable quantities of the product has a beneficial effect. In addition, minor sores in the mouth of the animal are beneficially treated by means of the product.

Accordingly, the present invention provides a method and product for cleansing and deodorizing the mouth of an animal. A particular feature and advantage of the invention is the fact that the method and product are convenient to apply, requiring no skill, causing no disturbance to the animal and consuming very little time.

A further feature of the invention is that brushing is not required as in ordinary dentrifices. The composition used in connection with the present invention is preferably of the "self-acting" type which requires no mechanical action of a brush to be effective. A self-acting dentifrice composition lends itself to use with a brush, but has a particular advantage in that merely placing the product in the mouth produces a foam on contact with saliva, which suspends and agitates the cleaning ingredients and accomplishes the cleaning operation without the use of a brush.

A feature of the product hereinafter described is the fact that it produces a foam when introduced in the mouth which suspends and agitates cleansing and scouring materials in the composition. The cleansing and scouring materials act efficiently to clean by a detergent or surfactant effect and by an abrading or scouring effect. Further, the composition has a neutral taste or is flavored in such manner as to be pleasing to the animal.

A further feature of the product is the fact that the foam tends to be stable, so as to support and agitate the cleansing materials for a relatively long period of time so that the product has an opportunity to work. Further, it is desirable and it is a feature of the product hereinafter described that the suspended particles be fine-grained so that they are more easily suspended and, further, are able to penetrate smaller cavities and recesses of the mouth.

Still another feature of the invention is the provision of a composition which contains an effective detergent material, and an abrasive material, the composition at the same time having a pleasant taste and the property of producing a fine, stable and highly effective foam on contact with saliva.

A particular feature of the invention is the fact that it completes grooming of the animal. Occasionally, it has been found that after veterinarians have carefully washed and groomed a dog, the owner objects to the odor of the animal, but such odor originates in the mouth rather than from failure to groom other portions of the animal. The present invention removes the objectionable mouth odor and thus enables the veterinarian to render a more satisfactory service to the customer.

Other objects and advantages of the invention will appear from the following description.

The present invention involves a method of treatment of the mouth of animals by spraying a liquid or powder into the mouth and causing an effervescence or foam by contact with normal saliva of the animal, with the result that certain of the components effervesce in a stable foam which agittaes and supports the abrasive detergent and other ingredients. After the product has had an opportunity to work, it is swallowed. In the preferred embodiment of the invention the product is packaged in a plastic squeeze bottle of well known construction having a spout of about two inches in length, which enables the user to squirt the product into the mouth of the dog, and particularly toward the back of the mouth, without the danger of being accidentally bitten.

The characteristics of the product have heretofore been generally described. A preferred embodiment of the invention employs substantially the following formula:

| | Parts by weight |
|---|---|
| Potassium bitartrate | 10 |
| Sodium bicarbonate | 15 |
| Sodium lauryl sulphate | 2 |
| White corn dextrine | 3 |
| Methylcellulose | ½ |
| Excipients (such as dry sorbitol or mannitol) | 10 |
| Dry flavor | 1½ |
| Calcium phosphate | 5 |
| Methyl parahydroxybenzoate | 1/10 |
| Propyl parahydroxybenzoate | 1/10 |

Reference is made to co-pending application of applicant Miller and Russell V. Lee, Serial No. 758,662, filed September 3, 1958, on Effervescent Dentifrice Composition, wherein a similar formula is disclosed shaped in tablet form for human use.

In the above composition the effervescent base is a mixture of potassium bitartrate and sodium bicarbonate. A sufficient quantity of bitartrate is employed to avoid an unpleasant taste created by unreacted sodium bicarbonate. In place of the potassium bitartrate, another nontoxic solid salt of an acid may be used which reacts with sodium bicarbonate on contact with saliva to evolve $CO_2$ such as, for example, ammonium or sodium acid tartrates, or ammonium, sodium or potassium acid citrates. Potassium bitartrate is preferred for the reason, among others, that its taste is more pleasant. In place of sodium bicarbonate, other nontoxic solid carbonates may be used which react with the acid on contact with saliva such as, for example, potassium bicarbonate. The proportions of bicarbonate and acid may be varied as long as the mixture evolves $CO_2$ efficiently.

A preferred abrasive is calcium phosphate, which is an effective scouring agent. Other inert insoluble solids, such as calcium dibasic phosphate, or diatomaceous earth, may be substituted. Such products are desirable because they are virtually tasteless, are highly insoluble and are not gritty and have no tendency to break down the foam produced on contact of the composition with saliva. The amount of abrasive component may be varied from five parts, or less, to twenty parts, or more, based on one-hundred parts of effervescent base.

A preferred detergent or cleansing agent is sodium lauryl sulfate, which also functions as a foam producing and foam stabilizing agent. Similar anion-active surface active agents may be used such as, for example, other sodium and potassium alkyl sulfates containing eight to twenty carbon atoms in the alkyl group. Also, alkyl aryl sulfonates, such as Oronite and Nacconol products. An example of an Oronite material is that described in Lewis Patent No. 2,477,383, column 25, lines 6 to 31. Nacconols are described in Schwartz and Perry, "Surface Active Agents," 1949, page 172. These are benzene sulfonates in which the benzene ring is substituted by a mixture of alkyl radicals derived from kerosene. In place of an anion-active surface active agent, such as those mentioned above, a nontoxic cationic or nonionic surface active agent may be used. A sodium lauryl sulfate, or alkali metal alkyl sulfates, are preferred because of their effective cleansing and foam producing effect accompanied by a mild, non-bitter taste. The amount of surface active agent employed may vary from one part, or less, to five parts, or more, per one hundred parts of effervescent base.

A foam stabilizer and thickening and suspending agent is employed, of which a preferred example is methylcellulose. This thickens the aqueous phase and thereby stabilizes the foam and makes it a more suitable medium for suspension of the solids, especially the solid abrasive. Carboxymethyl cellulose may also be employed. The thickening agent may be employed in proportions varying from one part, or less, to five parts, or more, per one hundred parts of effervescent base, being used in quantity sufficient to effect the desired thickening and foam stabilizing result.

The white corn dextrine or other sugar in powder form such as lactose, or a fruit sugar such as fructose, are used partly as a binder and partly as a flavoring composition. The dextrin or other sugars smoothes over the carbon dioxide reaction and prevents harshness in the product. The binder component may be employed in the amount of from ten parts, or less, to forty parts, or more, per one hundred parts of effervescent base.

The excipients act as a general carrier and an artificial sweetener. The excipient may be sorbital or mannitol.

Various flavor components may be used such as, for example, any one or any combination of essential oils, such as oil of spearmint, oil of peppermint, oil of wintergreen, or artificial rootbeer flavor. In a preferred embodiment of the invention the flavor material is spray-dried into a natural gum, such as gum arabic, gum tragacanth, or gum acacia, or a synthetic gum such as methyl cellulose. This step results in encasing the droplets of the oil in a gum coating to protect the flavor from reaction with other ingredients and against evaporation and oxidation. The flavor may be used in any amount desired such as, for example, two to five parts per one hundred parts of effervescent base.

A preservative, such as the combination of methyl parahydroxybenzoate or propyl parahydroxybenzoate functions to inhibit the deterioration of the product and of the detergent materials in the composition, to inhibit bacterial and mold contamination and decay and prevent racidity of the oils. The benzoates also act to enhance the bacteriostatic properties of the product. About 0.05%, more or less, is a sufficient preservative based on one hundred parts by weight of effervescent base.

The functioning of the more important components of the composition are as follows:

(1) The bitartrate and bicarbonate form an effervescent base, giving a controlled small bubble effervescence which penetrates into the small cavities of the mouth of the animal, between the teeth and other relatively inaccessible places.

(2) The sulfate and phosphate act as oral detergent and cleansing agents, scouring the food and other foreign particles.

(3) The methyl cellulose acts as a foam stabilizer to convert the normal violent coarse and unstable foam produced by the effervescent base into a gentle fine stable foam, which is much more efficient in dispersing and agitating the foam.

(4) The dextrine smooths over the carbon dioxide reaction and prevents harshness of the product.

(5) The excipients act as a general carrier and artificial sweetening.

(6) The preservative preserves the product and enhances the bacteriostatic properties of the product.

(7) Dry-flavoring agents are preferred to prevent moisture in the flavoring of the product.

An antienzyme agent might be incorporated in the formula such as, for example, sodium N-lauroyl sarcostinate.

When the product is sprayed in powder form into the mouth, or is dissolved in a liquid and then sprayed into the mouth of the animal, it disperses in the saliva very quickly and produces a very fine, gentle foam which persists for a considerable time. The foam contacts the teeth and gums, as well as the cavities of the flesh of the mouth and lips of the animal and thus an effective cleansing action is achieved. Swallowing the foam causes no ill effect.

It will be understood that the product heretofore described is an effective medium for bacteriocidal agent, such as soluble penicillin (sodium salt) and neomycin sulfate. ½% to 1% by weight of such agents may be employed per one hundred parts by weight of effervescent base.

What is claimed is:

1. A method of treating mouth odors in a domestic animal, comprising spraying the inside of the mouth of the animal with a powdered composition containing an effervescent base, an insoluble, fine abrasive, a detergent and a foam stabilizer, reacting the effervescent base with saliva in the mouth to produce a stable foam of effervescent base and detergent, suspending the abrasive and cleansing and deodorizing the mouth with the foam.

2. The method of claim 1, in which said composition is initially in dry powder form in a spray-type plastic squeeze bottle and in which said spraying is performed by squeezing said bottle to expel said composition in a cloud.

3. The method of applying an oral cleaning and deodorizing powdered composition for domestic animals containing an effervescent base, an abrasive insoluble in saliva, a foam stabilizer, an excipient, a preservative having bacteriostatic properties and a detergent, said ingredients being nontoxic and reacting on contact with saliva to evolve $CO_2$ to provide foam to disperse and agitate the abrasive, which comprises spraying said powdered composition in the mouth of a domestic animal to cleanse and deodorize the mouth.

4. The method of applying a mouth cleansing and deodorizing powder for domestic animals containing substantially the following ingredients in substantially the following proportions:

| | Parts by weight |
|---|---|
| Potassium bitartrate | 10 |
| Sodium bicarbonate | 15 |
| Sodium lauryl sulphate | 2 |
| White corn dextrine | 3 |
| Methylcellulose | ½ |
| Excipients | 10 |
| Dry flavor | 1½ |
| Calcium phosphate | 5 |
| Methyl parahydroxybenzoate | 1/10 |
| Propyl parahydroxybenzoate | 1/10 | which comprises spraying the mouth of a domestic animal with said powder to cleanse and deodorize the mouth.

References Cited in the file of this patent

UNITED STATES PATENTS

| 1,297,494 | Rhein | Mar. 18, 1919 |
| 2,946,725 | Norris | July 26, 1960 |

OTHER REFERENCES

U.S. Dispensatory, 25th Ed., 1955, p. 1664, Lippincott Co., Phila, Pa.